(12) United States Patent
Yasuda et al.

(10) Patent No.: US 7,662,512 B2
(45) Date of Patent: Feb. 16, 2010

(54) RECTANGULAR STORAGE BATTERY

(75) Inventors: Norifumi Yasuda, Wako (JP); Hisashi Katoh, Wako (JP); Tatsuya Kouda, Kawaguchi (JP); Sunao Morishita, Yokohama (JP); Hitoshi Toda, Yokohama (JP); Shinichi Kaneda, Yokohama (JP); Masayuki Ishii, Yokohama (JP)

(73) Assignees: Honda Motor Co., Ltd., Tokyo (JP); Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 11/793,652

(22) PCT Filed: May 16, 2006

(86) PCT No.: PCT/JP2006/010095

§ 371 (c)(1),
(2), (4) Date: Jun. 21, 2007

(87) PCT Pub. No.: WO2006/123812

PCT Pub. Date: Nov. 23, 2006

(65) Prior Publication Data

US 2008/0003498 A1    Jan. 3, 2008

(30) Foreign Application Priority Data

May 17, 2005 (JP) .............................. 2005-144559
May 17, 2005 (JP) .............................. 2005-144689

(51) Int. Cl.
*H01M 2/04*      (2006.01)
*H01M 10/04*     (2006.01)
*H01M 2/02*      (2006.01)

(52) U.S. Cl. ................. 429/175; 429/177; 429/182; 429/56; 429/180

(58) Field of Classification Search ............... 429/182, 429/175, 56, 180
See application file for complete search history.

(56) References Cited

U.S. PATENT DOCUMENTS 5,626,984 A * 5/1997 Albini ..................... 429/178
5,663,013 A * 9/1997 Narukawa et al. .......... 429/164
6,399,237 B1 * 6/2002 Souliac et al. ............. 429/56
2006/0141355 A1 * 6/2006 Kang ...................... 429/182

FOREIGN PATENT DOCUMENTS

| JP | 2-18920 Y2 | 5/1990 |
| JP | 3-28653 | 3/1991 |
| JP | 11-25993 A | 1/1999 |
| JP | 11-273631 | * 10/1999 |
| JP | 11-273631 A | 10/1999 |
| JP | 2001-273920 | * 10/2001 |
| JP | 2001-273920 A | 10/2001 |
| JP | 3561554 B2 | 9/2004 |

* cited by examiner

*Primary Examiner*—Dah-Wei Yuan
*Assistant Examiner*—Angela J. Martin
(74) *Attorney, Agent, or Firm*—Arent Fox LLP

(57) ABSTRACT

A square-shaped storage battery including a rectangular accumulator element (16), a sealed case (30) that accommodates the accumulator element, and a resin plate (20) which is formed of a hard resin having insulating properties and interposed between the sealed case and the accumulator element for limiting movement of the accumulator element.

3 Claims, 7 Drawing Sheets

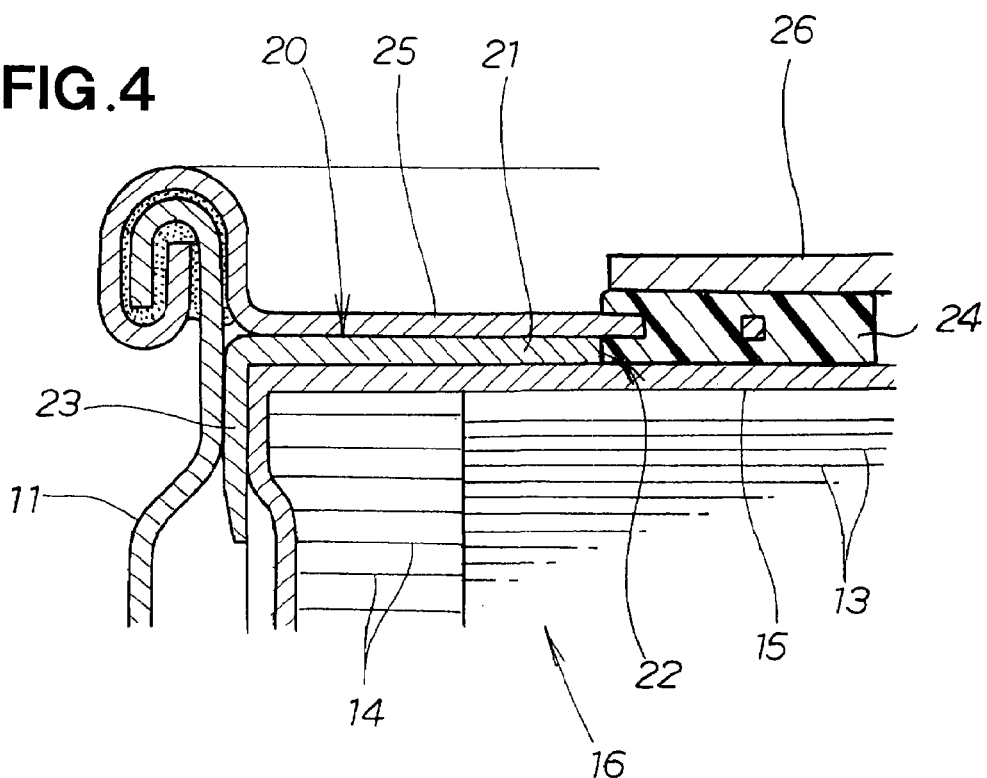
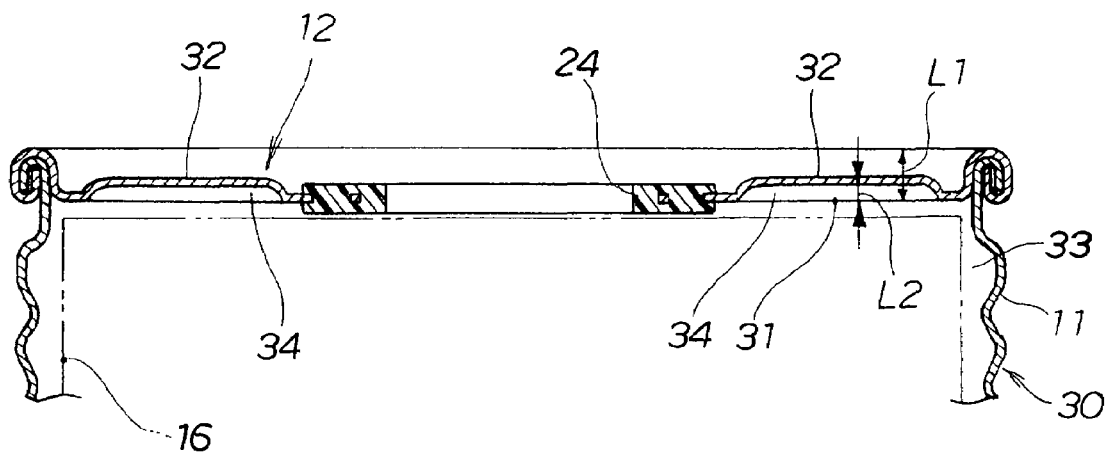
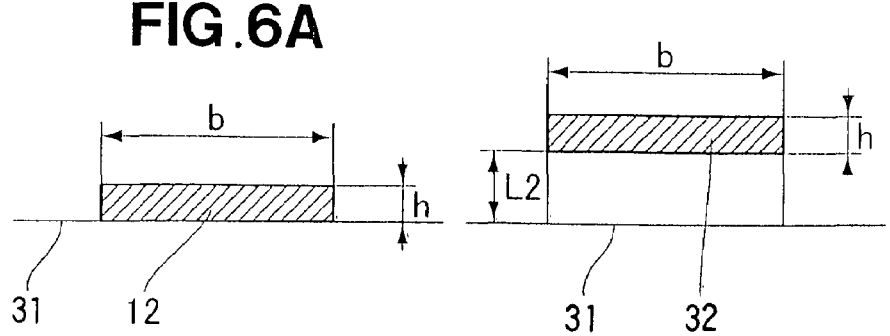

FIG.10
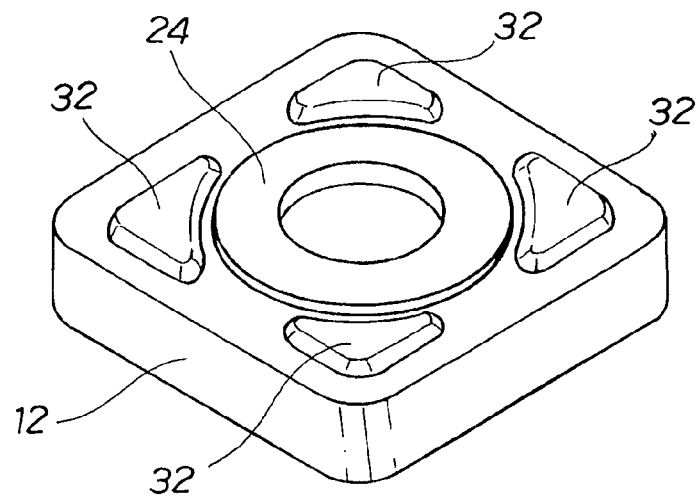
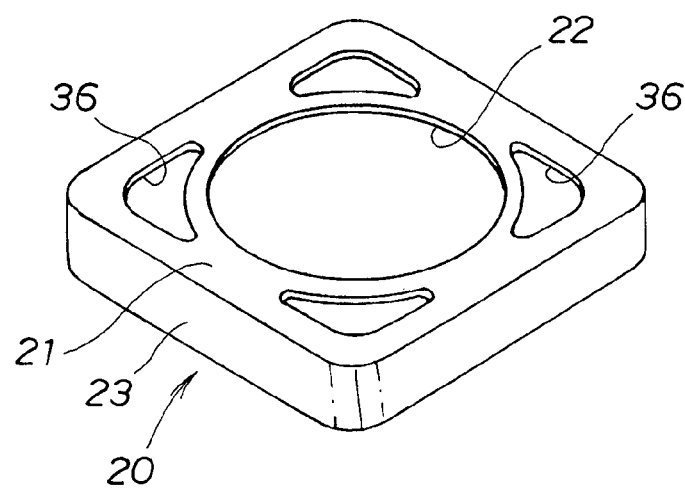
FIG.11
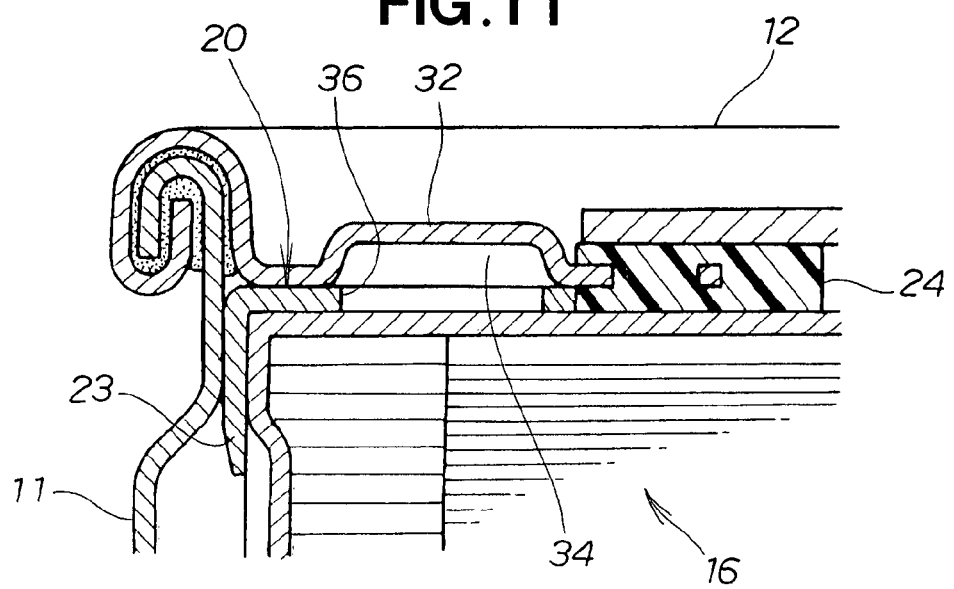

RECTANGULAR STORAGE BATTERY

CROSS-REFERENCE TO RELATED APPLICATION

This application is a National Stage entry of International Application No. PCT/JP2006/310095, filed May 16, 2006, the entire specification claims and drawings of which are incorporated herewith by reference.

TECHNICAL FIELD

The present invention relates to a rectangular or square-shaped storage battery having a square-shaped sealed case with a rectangular accumulator element housed therein.

BACKGROUND ART

The increased use of electrical/electronic devices in automotive vehicles has been accompanied by the expanded application of secondary batteries, electrolytic capacitors, capacitors, and other chargeable storage batteries.

JP-A-2003-308810 illustrates a structure of a storage battery in which an accumulator element is housed in a sealed case. This storage battery will be described with reference to FIG. 12 hereof.

The storage battery 100 shown in FIG. 12 comprises a cylindrical case 101; an accumulator element 102 housed in the cylindrical case 101; lead wires 103 extending from the accumulator element 102; collector plates 104, 104 connected to a positive or negative pole of the lead wires 103; end plates 108, 108 for closing openings at either end of the cylindrical case 101; electrode rods 105, 105 that extend from the collector plates 104, 104 and pass through the end plates 108, 108; nuts 106, 106 threaded onto distal ends of the electrode rods 105, 105; and pins 107, 107 passing through the collector plates 104, 104 from the end plates 108, 108 toward the center of the cylindrical case 101.

A DC voltage is applied to the electrode rods 105, 105 through harnesses 109, 109, enabling electrical energy to be stored in the accumulator element 102. The electrical energy stored in the accumulator element 102 can also be drawn out via the electrode rods 105, 105, and the harnesses 109, 109.

The harnesses 109, 109 are fixed to the electrode rods 105, 105 by the nuts 106, 106. A rotational force is applied to the electrode rods 105, 105 when the nuts 106, 106 are threaded on, but rotation of the collector plates 104, 104 is restricted by the pins 107, 107. Therefore the electrode rods 105, 105 do not rotate.

The pins 107, 107 play a vital role in preventing rotation of the collector plates 104, 104 and the electrode rods 105, 105.

If L1 is taken as the length of the accumulator element 102 and L2 is taken as the length of the cylindrical case 101, then the length L2 of the cylindrical case will determine the length of the pins 107, 107, and will therefore increase. Specifically, the length L1 of the accumulator element 102 is determined by the desired storage capacity. The length L2 of the cylindrical case 101 increases in relation to the length L1, and a problem is presented insofar as the case 101 increases in size proportionately in regard to the storage capacity.

Furthermore, the storage battery 100 is filled with an electrolyte to bring about an electrochemical reaction. A part of the electrolyte is converted to a gas by the electrochemical reaction. The internal pressure of the storage battery 100 increases due to the resulting gas. The cylindrical case 101 is a tube and is therefore highly capable of resisting the internal pressure, but the end plates 108, 108 are flat plates and are therefore not highly capable of withstanding the internal pressure.

In order to compensate for this weakness, the end plates 108, 108 are made several times as thick as the cylindrical case 101. The weight of the storage battery 100 increases due to the additional thickness of the end plates 108, 108.

When multiple storage batteries are to be mounted in a vehicle, the storage battery 100 is preferably made smaller and lighter.

DISCLOSURE OF THE INVENTION

According to the present invention, there is provided a square-shaped storage battery comprising: a rectangular accumulator element; a sealed case having a square tube that encloses the accumulator element and at least one lid that closes an opening of the square tube; and a resin plate composed of a hard resin having insulating properties and interposed between the sealed case and the accumulator element for suppressing movement of the accumulator element.

By virtue of the resin plate inserted between the sealed case and the accumulator element, the accumulator element is prevented from rotating. The sealed case can be of a length that allows for the resin plate to be inserted between the sealed case and the accumulator element. The resin plate is thin, enabling the sealed case to be made smaller. A smaller size allows the sealed case to be made lighter, and the square-shaped storage battery can therefore be made smaller and lighter.

Preferably, the resin plate comprises a flat plate disposed in parallel to the lid and a skirt bent at a right angle to the flat plate and disposed in parallel to the square tube.

Desirably, one of the square tube and the lid comprises a metal plate and an insulating resin film covering the metal plate.

It is desired that the lid be in the form of a rectangular plate with a general surface and has convexities protruding from four corners of the general surface.

In a desired form, the convexities protrude away from the accumulator element.

Desirably, the lid is mounted on the square tube so that the general surface and the convexities do not protrude from the end of the square tube.

Preferably, the resin plate is provided with through-holes that connect the accumulator element and the convexities.

BRIEF DESCRIPTION OF THE DRAWINGS

FIG. 4 is an enlarged view of the main part of FIG. 3;

FIG. 5 is a sectional view of the main part of a sealed case which forms part of the square-shaped storage battery;

FIGS. 6A and 6B are views showing an operation of convexities which form main parts of the square-shaped storage battery;

FIG. 10 is an exploded perspective view of the lids and the resin plate, which form main parts of the square-shaped storage battery;

FIG. 11 is a view showing the lids and the resin plate; and

BEST MODE FOR CARRYING OUT THE INVENTION

Figure 1:
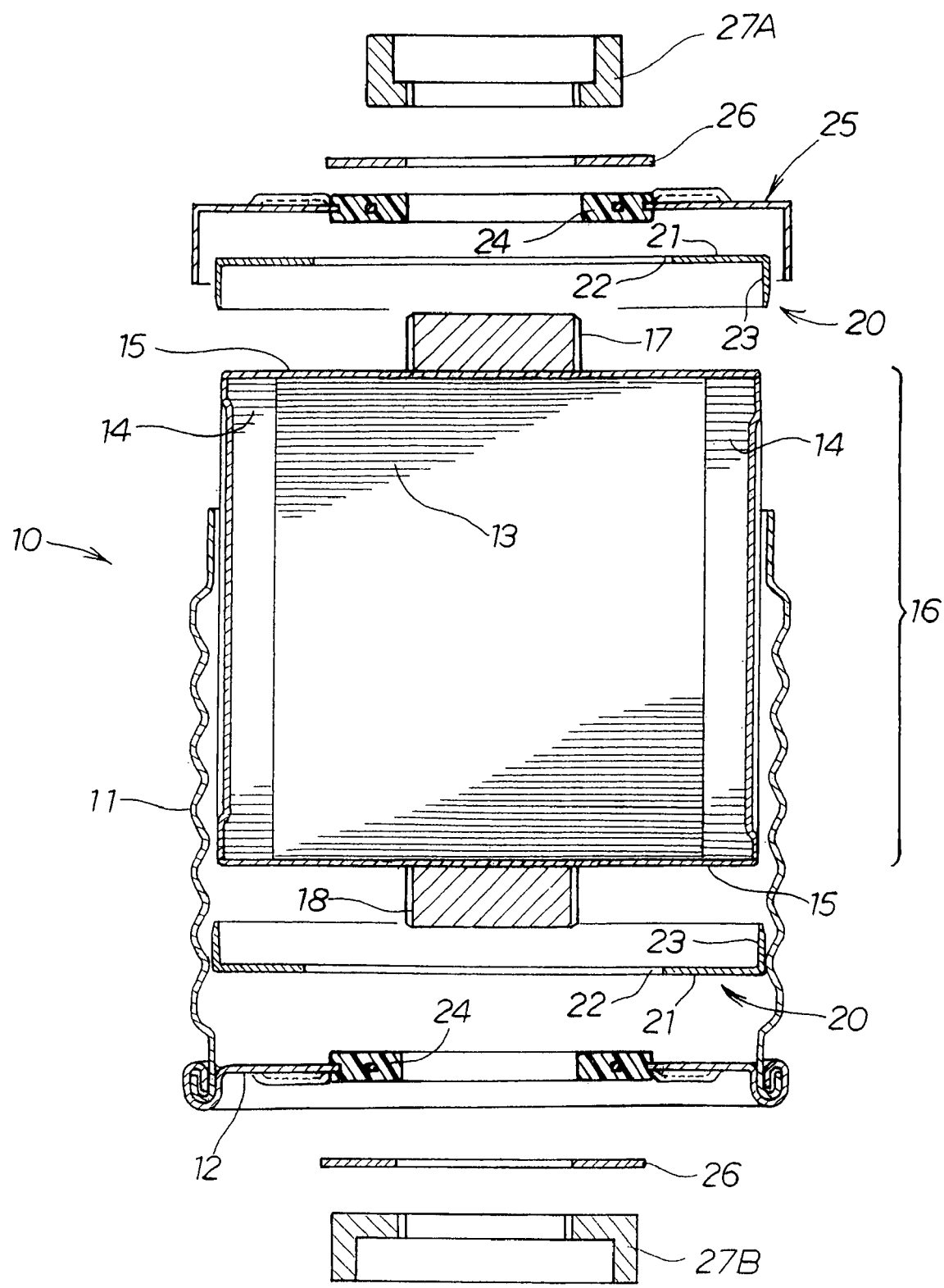
FIG. 1 is an exploded view of the square-shaped storage battery according to the present invention.

As shown in FIG. 1, a square-shaped storage battery 10, which is often called an accumulator, comprises a corrugated square tube 11; one lid 12 mounted in advance on the square tube 11; an accumulator element 16 having an overall rectangular shape on which adjacent metallic foils 13, 13 are laminated such that a small gap remains, and which is connected to L-shaped collector plates 15, 15 via a plurality of leads 14; electrode rods 17, 18 that extend from the top and bottom surfaces of the accumulator element 16; resin plates 20, 20 comprising a skirt 23 and a flat plate 21 provided with a hole 22; another lid 25 provided with an annular seal member 24; a washer 26 and a nut 27A fitted on the electrode rod 17; and a washer 26 and a nut 27B fitted on the electrode rod 18. A seal member 24 is also provided to the other lid 12.

Specifically, each of the resin plates 20 comprises a flat plate 21 provided with a large hole 22 and a skirt 23 formed so as to bend away from the flat plate 21.

Figure 3:
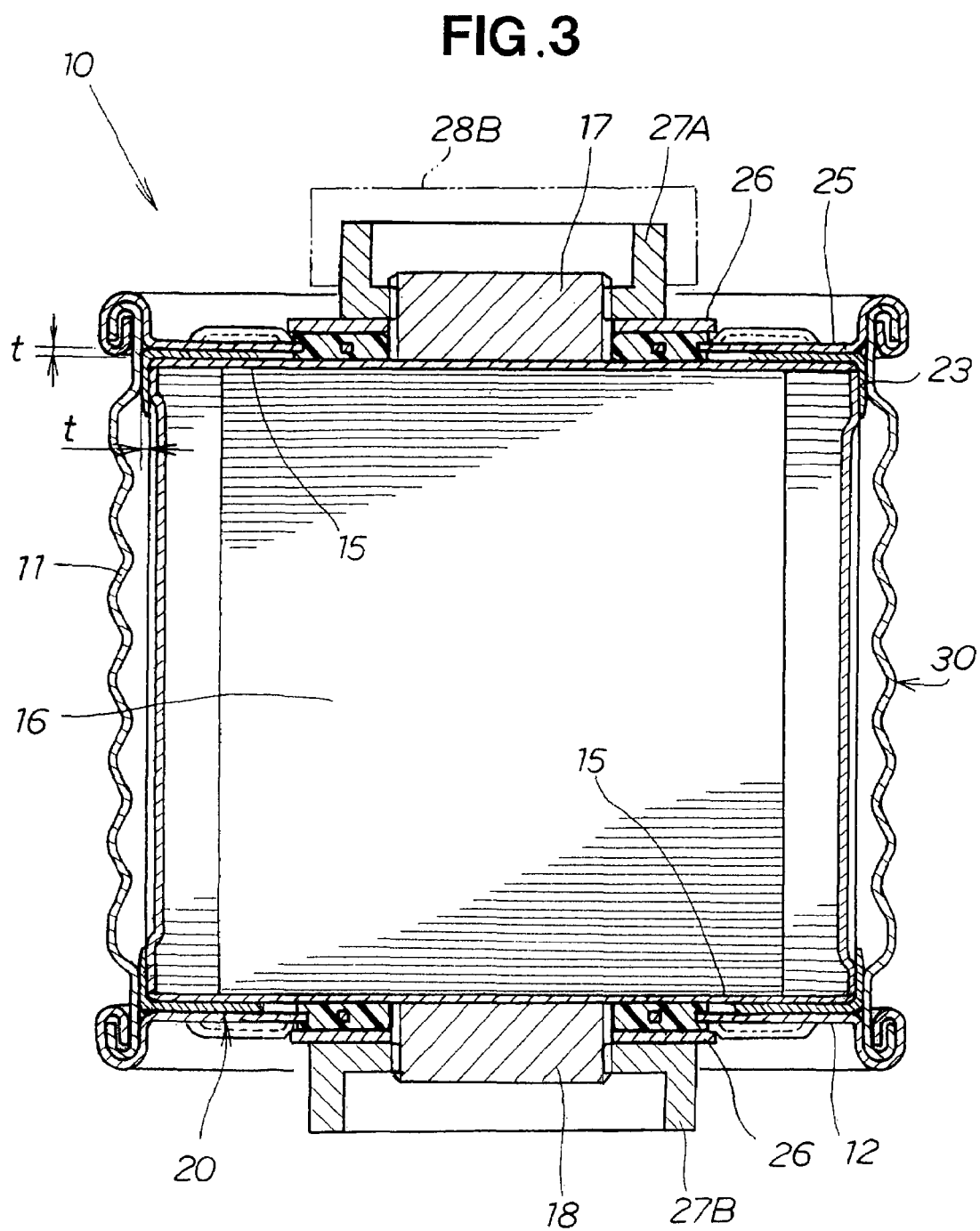
FIG. 3 is a sectional view of the square-shaped storage battery.

The resin plates 20 can be positioned on the accumulator element 16 merely by placing the flat plate 21 on the top or bottom surface of the rectangular accumulator element 16. As shown in FIGS. 3 and 4, the resin plate can be positioned so that the flat plate 21 is disposed between and in direct contact with the lid of the seal case 25 and the end surface of the accumulator element 16, wherein the skirt 23, bent at a right angle relative to the flat plate 21, is disposed between and in direct contact with a peripheral surface of the square tube 11 and a peripheral surface of the accumulator element 16.

Figure 2:
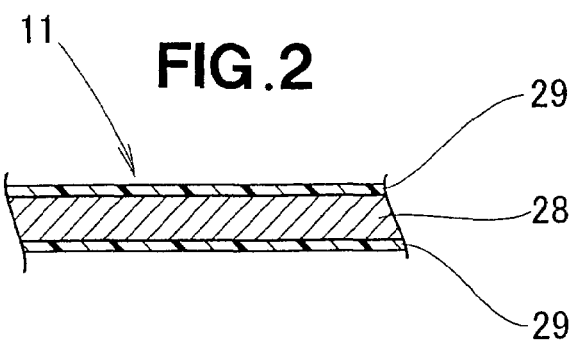
FIG. 2 is an enlarged sectional view of a square tube that forms part of the square-shaped storage battery.

The square tube 11 is preferably an insulating resin-covered metal plate wherein both surfaces of a metal plate 28 composed of aluminum or another material are clad with insulators 29, 29 made of PET (polyethylene terephthalate) or another material, as shown in FIG. 2.

As shown in FIG. 3, the square-shaped storage battery 10 comprises the rectangular accumulator element 16; a sealed case 30 comprising the square tube 11 that surrounds the accumulator element 16, and the lids 12, 25 that close off the openings of the square tube 11; and the hard insulating resin plates 20, 20, which are inserted into gaps t, t between the sealed case 30 and the accumulator element 16 in order to restrict movement of the accumulator element 16.

If movement is assumed to be along the horizontal direction with respect to the view, the resin plates 20 do not have to be separated from the top and bottom surfaces of the rectangular accumulator element 16. The skirt 23 may hang over the accumulator element 16, and even if the skirt is short, no concerns will be raised that the resin plates 20 will separate from the accumulator element 16. In other words, the resin plate 20 can be readily made smaller and lighter because the skirt 23 can be shortened.

When the nut 27A is threaded onto the electrode rod 17, the collector plate 15, which forms the top surface of the accumulator element 16, will tend to rotate with the nut 27A. A detailed description is provided below in relation to the function of the resin plates 20, 20, which have a rotation-preventing effect.

FIG. 4 is an enlarged view of the main elements of FIG. 3. The movement of the collector plate 15 will be prevented by the skirt 23 that extends along the square tube 11, assuming that the collector plate 15 moves towards the left of the drawing. As a result, no concern is presented that the collector plates 15, 15 will rotate when the nut 27A (FIG. 3) is turned. The same applies for the nut 27B.

The rotation can be prevented merely with the hard, thin resin plate 20. The inside diameter (dimensions) of the square tube 11 can be set by adding two times the thickness of the resin plate 20 to the diameter (dimensions in the horizontal direction with respect to the drawing) of the accumulator element 16. The diameter of the square tube 11 can be reduced because the skirt 23 is thin, and the size of the storage battery can be reduced.

Since the skirt 23 is short, a gap can be formed between the inside diameter of the square tube 11 and the outer diameter of the accumulator element 16. The gap can be used as a space for accommodating gas that is produced by an electrolyte or the like.

Furthermore, vertical movement of the accumulator element 16 can be reduced because the flat surface 21 of the resin plate 20 is positioned between the other lid 25 and the collector plate 15.

The use of resin-coated metal plates for the square tube 11 enables insulation between the square tube 11 and the accumulator element 16 to be achieved with a resin film. However, if the accumulator element 16 is directly connected to the square tube 11, then after prolonged use the resin film coated on the inner surface of the square tube 11 (one of the insulators 29 in FIG. 2) will wear away and peel off due to the thermal expansion and contraction of the accumulator element 16 and the expansion of the square tube 11 due to internal pressure, causing insulation failure.

For this reason, the resin film (one of the insulators 29 in FIG. 2) and the resin plate 20 are both endowed with an insulating function in the present invention. Therefore, if peeling of the resin film (one of insulators 29 in FIG. 2) does occur, no concerns relating to insulation failure will be presented because the insulating function of the resin plate 20 will remain intact.

The resin plate 20 may accordingly exhibit the two functions of insulation and rotation-prevention.

The resin plate 20 may be of any shape and size, and an uncovered metal plate; i.e., without an insulating film, can be used for the square tube.

Next, the shape of the main elements of the sealed case 30 will be described.

The bottom surface of the lid 12 is referred to as the general surface 31, as shown in FIG. 5. Convexities 32, 32 protrude from the lid 12 in a direction upwards and away from the accumulator element 16 (as indicated by the imaginary line).

The volume of pockets 34, 34 formed by the convexities 32 is added to the space 33 formed by the gap between the accumulator element 16 and the square tube 11. The increase in volume created by the pockets 34, 34 can be 5 to 10% of the internal volume of the sealed case 30. Since the volume is increased, changes in gas pressure can be slowed even if the electrolyte changes into a gas, and the pressure that acts on the inner surfaces of the sealed case 30, as well as changes in the pressure, can be reduced.

The lid 12 is attached to the square tube 11 by a seaming method. For purposes of accommodating the seaming tool, the lid 12 must be brought into the interior of the square tube 11 by a distance of L1 from the end of the tube. The convexities 32 of the present invention protrude from the general surface 31 to a distance of L2, and L2 is set so as not to exceed L1. As a result, a plurality of square tubes 11 can be readily directly connected.

The operation of the convexities 32 will be described next with reference to FIG. 6. The lid 12 and the convexities 32 should be considered in terms of having a three-dimensional structure, but structural calculations are complicated. Therefore, the lid 12 and the convexities 32 have been replaced by two dimensional "bars" for purposes of convenience.

Specifically, FIG. 6A shows the general surface 31 and the lid 12 (without the convexities), which has a bottom surface in contact with the general surface 31. FIG. 6B schematically shows the general surface 31 and the convexities 32, which are separated from the general surface 31 by a distance of L1.

As shown in FIG. 6A, when the lid 12 has a vertical dimension (thickness) of d and a horizontal dimension of b, the cross-sectional secondary moment Ia of the lid 12 is $b \cdot h^3/12$.

As shown in FIG. 6B, the cross-sectional secondary moment Ib of the convexities 32, which are separated from the general surface 31 by a distance of L2, is determined as $Ia+(b \cdot h) \times (L2)^2$. Specifically, the cross-sectional secondary moment increases by $(b \cdot h) \times (L2)^2$ due to the presence of the convexities 32.

As the cross-sectional secondary moment increases, flexure decreases; therefore, the amount of flexure is less in FIG. 6B than in FIG. 6A.

A larger value for the cross-sectional coefficient, which is obtained by multiplying the cross-sectional secondary moment by the distance component, correlates to less bending stress. The stress in FIG. 6B is accordingly less than in FIG. 6A.

As described above, the convexities exhibit an effect of reducing flexure and reducing stress (bending stress).

Figure 7A:
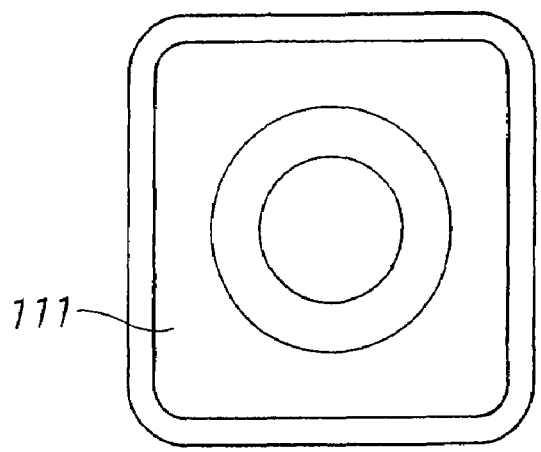
FIGS. 7A to 7D are comparative views of a conventional lid and a lid of the present invention.
Figure 7B:
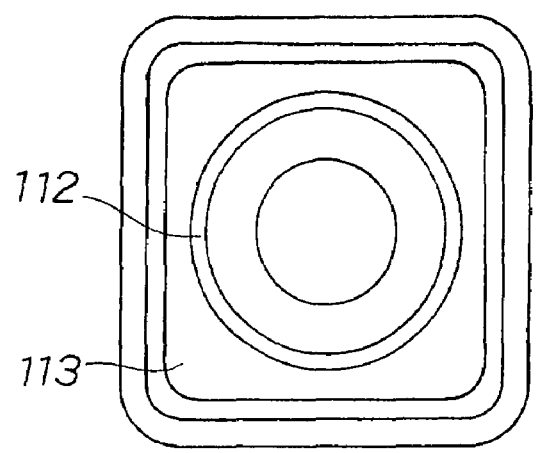

FIGS. 7A to 7D are comparative views in which a conventional lid is compared with the lid of the present invention. FIG. 7A shows a lid 111 without convexities. The lid 111 is referred to as "Comparative Example 1." FIG. 7B shows a lid 113 provided with an annular convexity 112. The lid 113 provided with the annular convexity 112 is referred to as "Comparative Example 2."

Figure 7C:
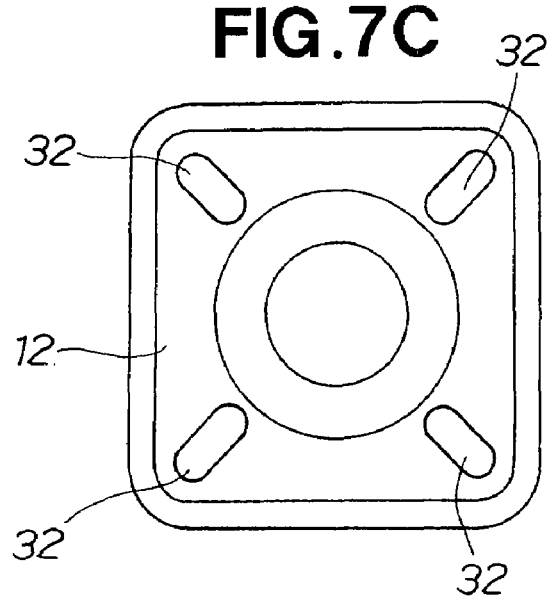
Figure 7D:
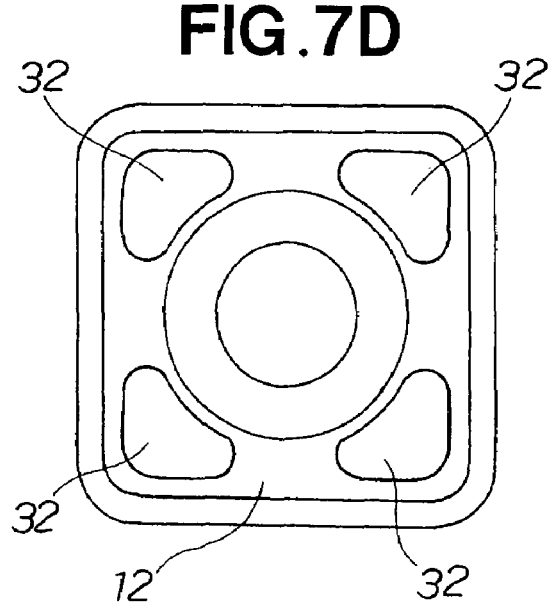

FIG. 7C shows a lid 12 provided with I-shaped convexities 32 in each of the four corners. This lid 12 is referred to as "Working Example 1." FIG. 7D shows a lid 12 provided with triangular convexities 32 in each of the four corners. This lid 12 is referred to as "Working Example 2."

The structural calculations of the comparative examples 1, 2 and working examples 1, 2 are carried out according to the following conditions.

Calculation Conditions
  Vertical/horizontal dimensions of the lid: 60 mm×60 mm
  Center hole dimensions: 23 mm
  Lid thickness: 0.5 mm
  Lid material: JIS A3004-0
  Load (internal pressure): 0.6 MPa
  Convexity shape/size: refer to FIGS. 7A to 7D The lid has a three-dimensional "surface," the peripheral sides thereof are fixed, a distributed weight is applied, and the resulting flexure and stress are calculated. The results of the calculations will be described with reference to FIGS. 8 and 9.

Figure 8:
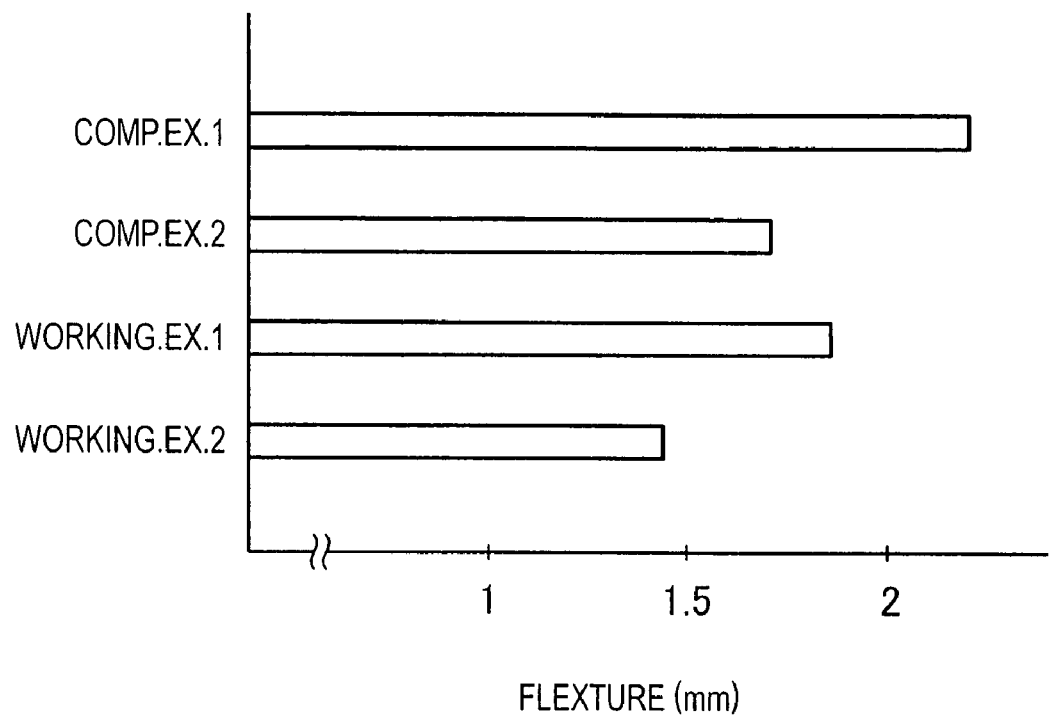
FIG. 8 is a view comparatively showing the bending in the central positions of the lids.

The flexure in the central position of the lid exceeded 2 mm in Comparative Example 1, and was about 1.7 mm in Comparative Example 2, as shown in FIG. 8. Flexure was about 1.8 mm in Working Example 1, which was slightly greater than in Comparative Example 2. Flexure was lowest in Working Example 2 (about 1.4 mm).

Figure 9:
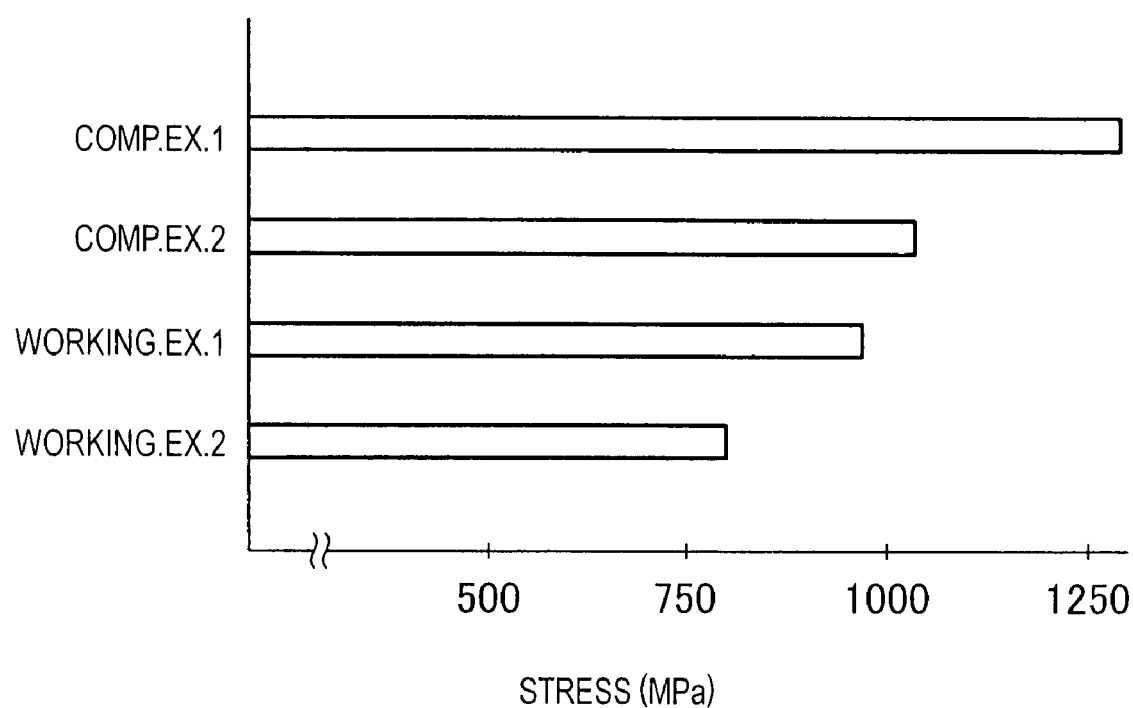
FIG. 9 is a view comparatively showing the stress in the central position of the lids.
Figure 12:
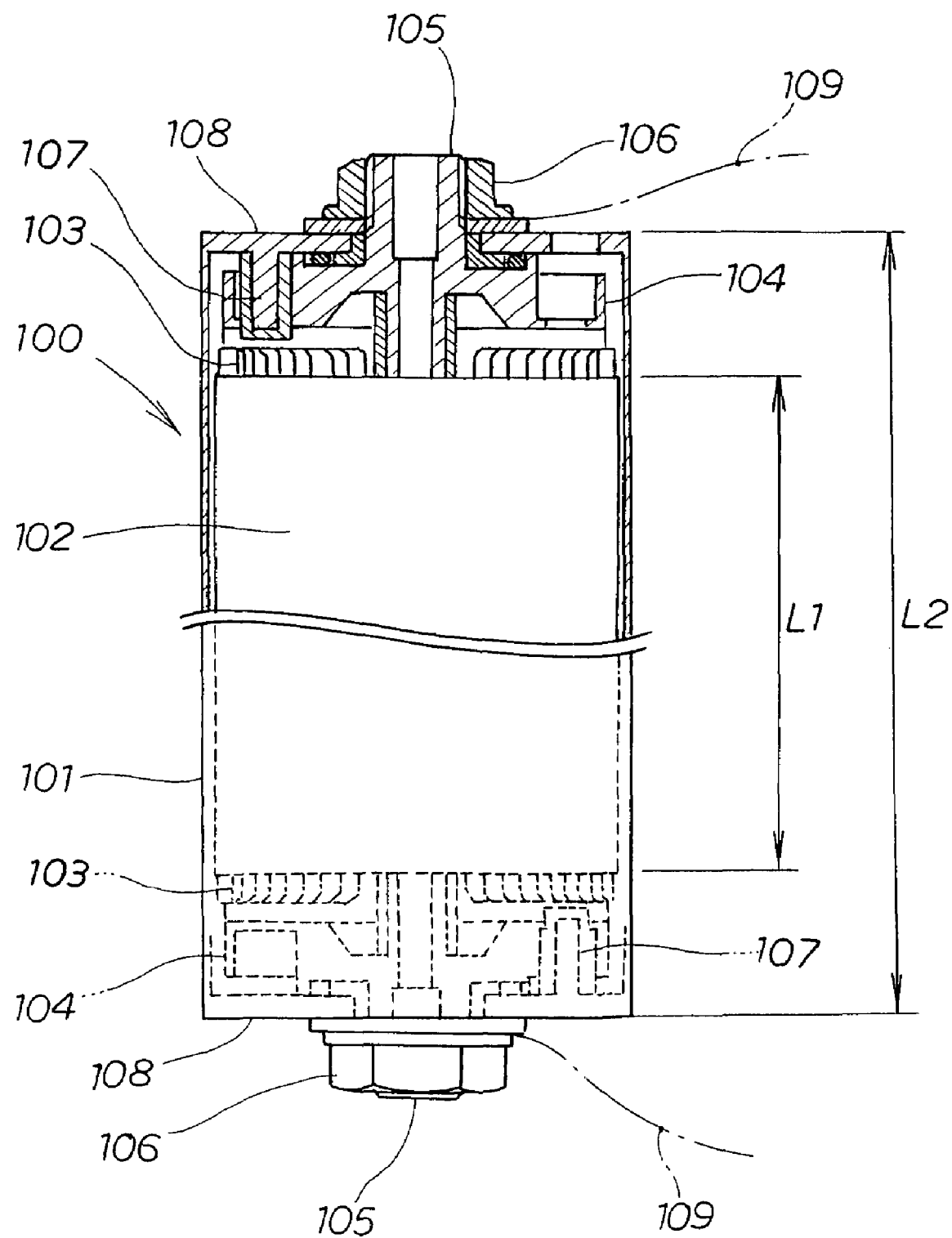
FIG. 12 is a sectional view of a conventional storage battery.

The stress in the central position of the lid was about 1300 MPa in Comparative Example 1, and about 1100 MPa in Comparative Example 2, as shown in FIG. 9. By contrast, Working Example 1 had a stress of about 950 MPa, which was less than that of Comparative Example 2, and Working Example 2 exhibited the least stress (about 800 MPa).

Therefore, Working Example 2 exhibited the least flexure and stress.

The above results show that the convexities 32 (FIGS. 5C, 5D provided to each of the four corners in the present invention reduce flexure and stress more than do conventional annular convexities (numerical symbol 112 in FIG. 7B). Providing convexities that are separate from one another is therefore structurally superior to continuous convexities (annular convexities).

A further preferable aspect of the resin plate 20 will now be described.

As shown in FIG. 10, the resin plate 20 is provided with triangular through-holes 36 in the four corners of the flat plate 21.

When the lid 12 is aligned with the resin plate 20, the through-holes 36 are in alignment with the convexities 32, as shown in FIG. 11. The accumulator element 16 is connected to the pockets 34 via the through-holes 36. The gas that accumulates in the interior of the square tube 11 reaches the pockets 34 via the through-holes 36. Gas-induced changes in internal pressure can be alleviated because the pressure can be directly released to the pockets 34.

There are no restrictions as to the type of square-shaped storage battery 10 of the present invention as long as the battery is a secondary battery, an electrolytic capacitor, a capacitor, or another chargeable electrical device.

INDUSTRIAL APPLICABILITY

The square-shaped storage battery according to the present invention is particularly useful as a secondary battery mounted in a vehicle.

The invention claimed is:

1. A square-shaped storage battery comprising:
   a rectangular accumulator element;
   a sealed case having a square tube enclosing the accumulator element and at least one lid for closing off an opening of the square tube, wherein the at least one lid is in the form of a rectangular plate with a general surface and has convexities protruding from four corners of the general surface away from the accumulator element; and
   a resin plate comprised of an insulating hard resin and interposed between the sealed case and the accumulator element for suppressing movement of the accumulator element relative to the sealed case,
   wherein the accumulator element has an end surface facing the at least one lid of the sealed case and a peripheral surface contiguous to the end surface and facing a peripheral surface of the square tube, and
   wherein the resin plate comprises a flat plate disposed between and in direct contact with the lid of the seal case and the end surface of the accumulator element, a skirt bent at right angle relative to the flat plate and disposed between and in direct contact with the peripheral surface of the square tube and the peripheral surface of the accumulator element, and a through-hole via which the accumulator element and the convexities are linked.

2. The storage battery of claim 1, wherein one of the square tube and the lid comprises a metal plate, and an insulating resin film covering the metal plate.

3. The storage battery of claim 1, wherein the lid is mounted on the square tube such that the general surface and the convexities do not protrude out of an end of the square tube.

* * * * *